(12) United States Patent
Kane et al.

(10) Patent No.: US 11,482,828 B2
(45) Date of Patent: Oct. 25, 2022

(54) PASSIVELY Q-SWITCHED LASER AND LASER SYSTEM FOR RANGING APPLICATIONS

(71) Applicants: Thomas James Kane, Menlo Park, CA (US); John Lawrence Nightingale, Portola Valley, CA (US)

(72) Inventors: Thomas James Kane, Menlo Park, CA (US); John Lawrence Nightingale, Portola Valley, CA (US)

( * ) Notice: Subject to any disclaimer, the term of this patent is extended or adjusted under 35 U.S.C. 154(b) by 117 days.

(21) Appl. No.: 16/911,399

(22) Filed: Jun. 25, 2020

(65) Prior Publication Data

US 2020/0412080 A1 Dec. 31, 2020

Related U.S. Application Data

(60) Provisional application No. 62/979,937, filed on Feb. 21, 2020, provisional application No. 62/868,765, filed on Jun. 28, 2019.

(51) Int. Cl.
| | |
|---|---|
| *H01S 3/113* | (2006.01) |
| *H01S 3/08* | (2006.01) |
| *H01S 3/131* | (2006.01) |
| *H01S 3/11* | (2006.01) |
| *H01S 3/04* | (2006.01) |

(Continued)

(52) U.S. Cl.
CPC ...... *H01S 3/08022* (2013.01); *H01S 3/08031* (2013.01); *H01S 3/08036* (2013.01); *H01S 3/113* (2013.01); *H01S 3/1115* (2013.01); *H01S 3/1315* (2013.01); *H01S 3/0405* (2013.01); *H01S 3/0621* (2013.01); *H01S 3/0627* (2013.01); *H01S 3/0805* (2013.01); *H01S 3/09415* (2013.01); *H01S 3/139* (2013.01); *H01S 3/1312* (2013.01); *H01S 3/1611* (2013.01); *H01S 3/1673* (2013.01)

(58) Field of Classification Search
CPC ................. H01S 3/113; H01S 3/08022–08036
See application file for complete search history.

(56) References Cited

U.S. PATENT DOCUMENTS

| | | | | |
|---|---|---|---|---|
| 4,953,166 A | * | 8/1990 | Mooradian | H01S 3/09415 372/21 |
| 5,210,764 A | * | 5/1993 | Bucher | H01S 3/082 372/9 |

(Continued)

FOREIGN PATENT DOCUMENTS

| | | | | |
|---|---|---|---|---|
| AU | 2001292109 B2 | * | 3/2006 | ............... G03H 1/26 |
| CN | 101030690 | * | 9/2007 | |
| EP | 2109921 B1 | * | 9/2011 | ............. G01S 7/484 |

OTHER PUBLICATIONS

Sulc et al. ("V:YAG saturable absorber for flash-lamp and diode pumped solid state lasers", Proc. SPIE 5460, Solid State Lasers and Amplifiers, (Sep. 1, 2004)) (Year: 2004).*

(Continued)

*Primary Examiner* — Tod T Van Roy

(57) ABSTRACT

A passively, Q-switched laser operating at an eye safe wavelength of between 1.2 and 1.4 microns is described. The laser may operate at a lasing wavelength of 1.34 microns and use a gain element of $Nd:YVO_4$ and a saturable absorber element of V:YAG. The position of the resonator axial mode spectrum relative to a gain peak of the gain element is controlled to yield desired characteristics in the laser output.

20 Claims, 8 Drawing Sheets

(51) Int. Cl.
*H01S 3/0941* (2006.01)
*H01S 3/139* (2006.01)
*H01S 3/16* (2006.01)
*H01S 3/06* (2006.01)

(56) References Cited

U.S. PATENT DOCUMENTS

| | | | | |
|---|---|---|---|---|
| 5,892,586 | A * | 4/1999 | Thony | G01N 21/39 |
| | | | | 356/437 |
| 6,400,495 | B1 | 6/2002 | Zayhowski | |
| 7,224,707 | B2 * | 5/2007 | Gendron | H01S 3/08031 |
| | | | | 372/10 |
| 7,254,148 | B2 * | 8/2007 | Masuda | H01S 3/0627 |
| | | | | 372/29.02 |
| 7,648,290 | B2 * | 1/2010 | Feve | H01S 3/09415 |
| | | | | 385/93 |
| 8,126,023 | B2 * | 2/2012 | Stiens | H01S 3/11 |
| | | | | 372/19 |
| 8,446,925 | B2 | 5/2013 | Goldberg et al. | |
| 8,811,440 | B2 * | 8/2014 | Sandstrom | H01S 3/1305 |
| | | | | 372/38.01 |
| 9,515,448 | B2 * | 12/2016 | Stultz | H01S 3/08036 |
| 9,989,629 | B1 | 6/2018 | LaChapelle | |
| 2003/0118060 | A1 | 6/2003 | Spuehler et al. | |
| 2006/0076455 | A1 | 4/2006 | Ljungberg et al. | |
| 2007/0064747 | A1 * | 3/2007 | Feve | H01S 3/025 |
| | | | | 372/10 |
| 2010/0309936 | A1 * | 12/2010 | Lefort | H01S 3/113 |
| | | | | 372/11 |
| 2017/0123052 | A1 | 5/2017 | Hinderling | |
| 2018/0188371 | A1 * | 7/2018 | Bao | G01S 7/484 |
| 2018/0269646 | A1 | 9/2018 | Welford | |
| 2020/0076152 | A1 * | 3/2020 | Eichenholz | H01S 3/094076 |

OTHER PUBLICATIONS

Malyarevich, A. M., Denisov, I. A., Yumashev, K. V., Mikhailov, V. P., Conroy, R. S., and Sinclair, B. D., "V:YAG—a new passive Q-switch for diode-pumped solid-state lasers," Appl. Phys. B 67, 555-558 (1998).

Sulc, J., Jelinková, H., Nejezchleb, K. and Škoda, V., "Nd:YAG/V:YAG microchip laser operating at 1338 nm," Laser Phys. Lett. 2, No. 11, 519-524 (2005).

Sulc, J., Koutný, T., Jelinková, H., Nejezchleb, K. and Škoda, V., "Influence of V:YAG saturable absorber orientation on lineariy polarized laser Q-switching ," Proc. SPIE 7912, Solid State Lasers XX: Technology and Devices, 791222 (2011).

Kane Thomas J., "1.34 μm Nd:YVO4 laser passively Q-switched by V:YAG and optimized for lidar," Proc. SPIE 11259, Solid State Lasers XXIX: Technology and Devices, 1125902 (Feb. 21, 2020).

Hodgson, M. and Weber, H. "Laser Resonators and Beam Propagation, Single mode resonators", Springer, Chap 22, pp. 675-686 (2005).

Xu, X. and Diels, J. C., "Stable single axial mode operation of injection-seeded Q-switched Nd:YAG laser by real-time resonance tracking method", App. Phys. B, DOI 10.1007/s00340-013-5563-6 (2013).

* cited by examiner

| Case # | Single-pass absorption of V:YAG | Thickness of V:YAG | Pump beam diameter | Repetition rate | Pulse energy | Pulse duration | Peak Power |
|---|---|---|---|---|---|---|---|
| 1 | 2.5% | 0.16 mm | 63 microns | 1820 kHz | 0.43 µJ | 4.8 nsec | 68 W |
| 2 | 2.5% | 0.16 mm | 105 microns | 680 kHz | 0.92 µJ | 6.4 nsec | 110 W |
| 3 | 5% | 0.325 mm | 63 microns | 616 kHz | 0.76 µJ | 2.2 nsec | 262 W |
| 4 | 5% | 0.325 mm | 105 microns | 295 kHz | 1.38 µJ | 3.6 nsec | 291 W |
| 5 | 10% | 0.67 mm | 63 microns | 460 kHz | 0.8 µJ | 1.6 nsec | 380 W |
| 6 | 10% | 0.67 mm | 105 microns | 92 kHz | 3.8 µJ | 1.6 nsec | 1826 W |
| 7 | 21% | 1.22 mm | 105 microns | 11 kHz | 3.2 µJ | 1.3 nsec | 1902 W |
| 8 | 21% | 1.22 mm | 105 microns | 24 kHz | 2.5 µJ | 1.08 nsec | 1750 W |

PASSIVELY Q-SWITCHED LASER AND LASER SYSTEM FOR RANGING APPLICATIONS

PRIORITY

This application claims the benefit, under 35 U. S. C. § 119(e) of U.S. Provisional Patent Application No. 62/868,765, filed 28 Jun. 2019, and of U.S. Provisional Patent Application No. 62/979,937, filed 21 Feb. 2020, which are incorporated herein by reference.

FIELD OF THE INVENTION

The present invention relates to methods and systems for a laser ranging system using a passively Q-switched laser. The laser operates at wavelengths between 1.2 and 1.4 microns.

BACKGROUND

An important use of lasers is for ranging, that is, determining the distance from the laser to a target object. The most common way to do this is for the laser to emit a light pulse of short duration, and then for a small amount of that light pulse to be collected which has scattered off of the distant target, which is then detected by a detector co-located with the laser. The time of flight, when multiplied by the speed of light, gives the round-trip distance of the light. One half of this is the distance to the target.

Many early laser ranging systems made use of solid-state lasers based on neodymium operating at wavelengths near 1 μm, which is the wavelength at which neodymium lasers have the most gain and are thus easiest to make. Many military systems use a single large pulse and make a single range measurement to a specific target. The 1 μm wavelength is not considered eye-safe, since light is focused by the eye's lens and reaches the sensitive retina in a small, intense spot. The focused light can permanently damage the retina.

Later ranging systems had as a goal the measurement of a multitude of targets. In these systems a single laser beam is scanned over a region of interest, and the field of view of a detector, which receives the reflected laser signal, may be scanned as well. Many thousands of pulses may be used and a 3-dimensional image of the laser's surroundings can be created. For short range applications, approximately 100 meters or less, semiconductor lasers are ideal, since they are inexpensive and easy to pulse in a controlled manner, by controlling the current applied to the semiconductor laser. For longer ranges, Q-switched neodymium lasers have been used, again at wavelengths near 1 μm, or sometimes at half that wavelength, after conversion of the infrared light into the green spectral region in a nonlinear crystal. Q-switched lasers can easily reach peak powers of many hundreds of watts and above, while semiconductor lasers are limited to a few watts, and even then, with an inferior beam quality. These Q-switched lasers can measure range to longer distances, typically thousands of feet and beyond. These systems can in some cases be eye-safe, but only if power is kept very low, which severely limits either the range or the rate of data collection. The least expensive Q-switched neodymium lasers at the 1-μm wavelength are lasers passively Q-switched by chromium ions which are doped into a solid host material, most commonly yttrium aluminum garnet (YAG). These Cr:YAG passively Q-switched lasers typically use Nd:YAG as the laser gain material.

Recently, interest in laser ranging has greatly increased due to the advent of autonomous or semi-autonomous vehicles. Autonomous vehicles can create a model of the outside world partly from cameras, but the use of laser ranging greatly enhances the reliability of these models. In order to get a constantly-updated 3-D model, a high measurement rate is needed, requiring a laser with up to a million pulses per second. This allows a new view to be formed many times per second, with hundreds of thousands of pixels in the view. For short range, which is most critical for city driving, ranging systems based on semiconductor lasers may be adequate. For longer range, such as is needed for freeway driving, semiconductor lasers currently do not provide adequate peak power.

Laser ranging systems for freeway driving need a range exceeding 1000 feet. A type of laser system currently used in long range applications is a fiber-based, master oscillator, power amplifier architecture. In this system, a semiconductor laser provides pulses, which are amplified in a glass fiber doped with erbium ions, which is pumped by a second semiconductor laser. The typical operating wavelength is near 1.5 μm. This wavelength cannot reach the retina; it is absorbed in the surface tissue of the eye, before it is focused. This allows the laser intensity incident on the eye without harm to be much higher than if the laser were operating at a visible or near-infrared wavelength, such as 1 micron. A 1.5-micron wavelength laser may be denoted as an eye-safe laser because light at that wavelength is absorbed before reaching the retina.

These fiber-based lasers have peak power, average power, beam quality, and pulse duration adequate for vehicle ranging at freeway speed. However, they are expensive and bulky, typically a 4- or 5-inches square package approximately 0.5 inches thick.

In contrast to bulky and expensive fiber-based laser sources, non-fiber-based solid-state lasers pumped by a semiconductor laser can be small and inexpensive. For example, green laser pointers are about the size of a pencil and are relatively inexpensive. A passively Q-switched laser can have a part-for-part correspondence with a green pointer laser, and thus these lasers can be produced inexpensively.

What is needed is a laser which is eye safe and has a peak power, average power, beam quality, and pulse duration adequate for vehicle ranging at freeway speed, while having a low cost and small package size, while having good pulse-to-pulse energy and timing stability.

SUMMARY

A variety of laser resonators, lasers, and laser ranging systems are described. Methods of operating these elements and systems to determine a distance between a laser ranging system and a target are also described.

In some embodiments a laser resonator configured to operate at a lasing wavelength between 1.2 and 1.4 microns is described. The resonator has a gain element having a first and a second surface. The first surface has a highly reflective coating at the lasing wavelength between 1.2 and 1.4 microns and forms a first end of the resonator. The laser resonator also contains a saturable absorber element. A second end of the resonator is formed by a second surface having a partially transmitting optical coating at the lasing wavelength between 1.2 and 1.4 microns. A pump source having a pump beam is directed to the first surface of the gain element. An axial mode spectrum of a laser resonator formed between the first surface of the gain element and the second end of the laser resonator is controlled relative to a gain peak of the gain element. The axial mode spectrum may be positioned so that one peak in the axial mode spectrum is centered beneath the gain peak. The axial mode spectrum may be positioned so that two peaks in the axial mode spectrum are centered about the gain peak. The axial mode spectrum may be positioned so that it is neither centered on the gain peak nor has two peaks centered about the gain peak.

In other embodiments, a method of determining a distance between a platform and a target is described. A passively Q-switched laser mounted on the platform is operated in a series of pulses each pulse in the series of pulses having a wavelength between 1.2 and 1.4 microns. An axial mode structure of substantially all the pulses in the series of pulse of the passively Q-switched laser is controlled. A first signal representative of a time one pulse in the series of pulses is emitted from the passive Q-switched laser is measured. A second signal representative of a time a reflection off the target of the one pulse in the series of pulses is received by a detector mounted on the platform is measured. A distance between the platform and target is determined based on a time difference between the first signal and the second signal.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to methods and systems for a laser ranging system using a passively Q-switched laser. The laser operates at wavelengths between 1.2 and 1.4 microns. The laser can be described as a diode-pumped neodymium laser, operating at a wavelength in the range from 1.2 µm to 1.4 µm, which is caused to become a pulsed laser by inclusion of a saturable absorber material within the laser cavity. The saturable absorber may be based on vanadium ions in a crystalline or glass host material. Many design approaches, which optimize this type of laser for ranging, are described below.

Figure 1:
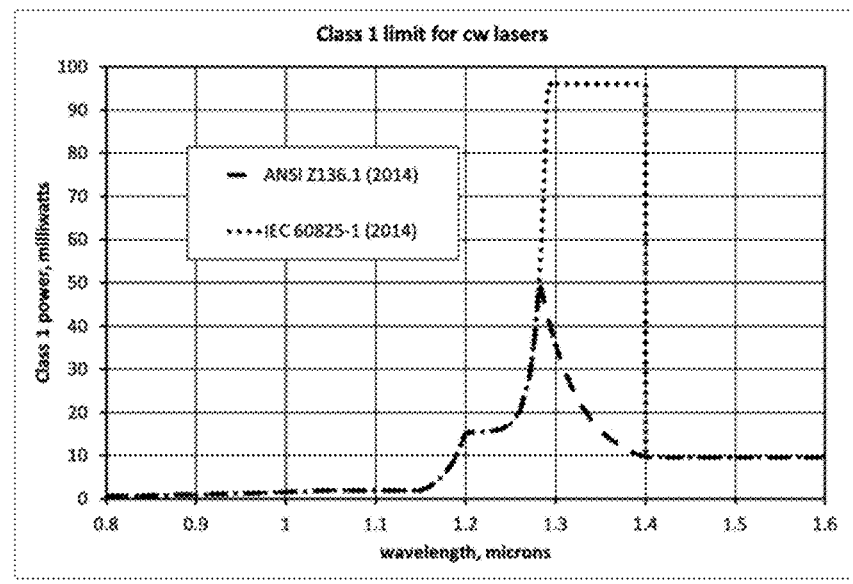
FIG. 1 is a plot of the allowable average power vs. wavelength for a Class 1 (eye-safe) laser.

For operation in an open uncontrolled environment, it is important that a laser ranging system be eye safe. Eye safety exists when an observer who is looking in the direction of the laser source of the laser ranging system will experience no eye damage as a result of exposure to the laser radiation. An eye safe level of laser power varies with the laser wavelength. Various standards have been established for what constitutes an eye safe laser. FIG. 1 plots the allowable laser power limit for an eye safe, class 1, laser as a function of laser wavelength. There are two standards plotted, the IEC and the ANSI standard. They generally overlap but differ somewhat in the wavelength range between 1.28 µm and 1.4 µm. Both standards indicate that the wavelength range having the highest allowable eye safe power level is between 1.2 and 1.4 microns. The highest allowable power corresponds to wavelengths near 1.3 microns. For this wavelength, the IEC standard allows continuous-wave laser powers as high as 95 mW and the ANSI standard allows laser powers as high as approximately 40 mW. The value of FIG. 1 applies to a beam which is a near-ideal ray of light. For beams which are spread out, or quickly scanned, as is the case for ranging systems, higher levels of power are considered to be safe, but still the 1.2-1.4 µm range permits the most power.

Figure 2:
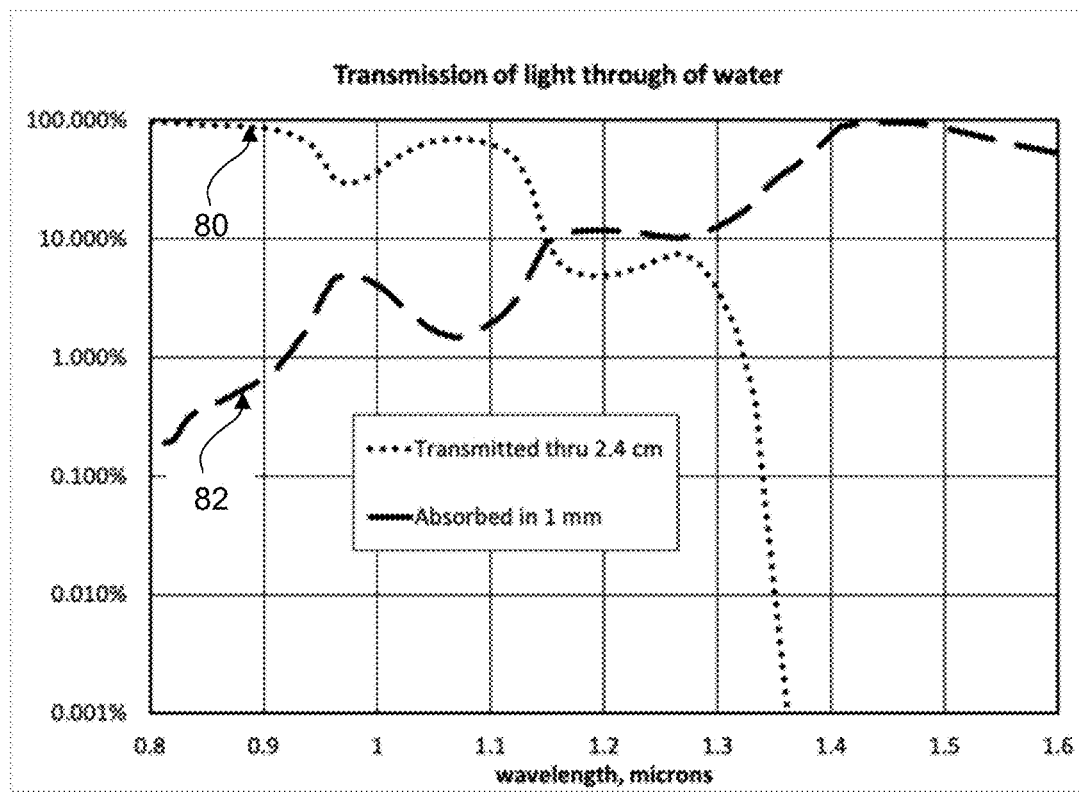
FIG. 2 is a plot of water transmission and absorption vs. wavelength.

The physical basis for the laser safety standards depicted in FIG. 1 is the threshold for damaging the retina or other eye tissue of an observer looking directly at an incoming laser beam. For many wavelengths, such as visible wavelengths, eye tissue is transparent, and incoming light is transmitted to and focused on the retina. As a result, very low optical power levels can burn a spot on the retina resulting in permanent eye damage. Referring back to FIG. 1, the allowable limit for an eye safe power begins to rise significantly for laser wavelengths longer than approximately 1.15 microns. This is a result of absorption of these wavelengths in the eye tissue between the eye's outer surface and the retina. This absorption is dominated by water absorption in the eye tissue. FIG. 2 illustrates water absorption as a function of wavelength.

The curve 80 of FIG. 2 shows the fraction of light which is transmitted through a 2.4-cm thick object made of water. The human eye is well modeled by such an object. Humans of all ages have the same size eyes; there is essentially no eye growth after birth. Note that at the deep red wavelength of 0.7 μm essentially all of the light is transmitted. At 1.2 μm it is down to 5%. At 1.4 μm it is essentially 0%, and no light reaches the retina.

The curve 82 of FIG. 2 shows the fraction of light absorbed in the first 1 mm of an object made of water. For wavelengths above 1.4 μm, essentially all of the light is absorbed in this first millimeter.

The advantage of the range from 1.2 μm to 1.4 μm is that while little of the light passes through 2.4 cm of water and reaches the retina, the light absorption is also not concentrated in the first millimeter. These wavelengths are safer for both the retina and for the eye's outer surface, because light absorption is distributed over the bulk of the eye.

Prior art passively Q-switched Nd:YAG lasers lasing near 1 micron with a Cr:YAG saturable absorber have some characteristics in common with the lasers described in this invention. They have cost and packaging considerations that are nearly identical. These lasers are small and inexpensive. But they suffer from three disadvantages, which are overcome by the disclosed invention. First, they operate at a wavelength which is a hazard to the retina. Second, they cannot operate at high pulse repetition rates, and are typically limited to about 50 kHz, due to the slow "recovery time" of the Cr:YAG saturable absorber. Third, they cannot operate with the otherwise-ideal laser material Nd-doped yttrium vanadate ($Nd:YVO_4$), since the ratio of the absorption cross-section of the saturable absorber to the gain cross-section of the laser material is not in the range which permits passive q-switching. The gain cross-section of $Nd:YVO_4$ at 1.34 μm is $2.6\times10^{-19}$ $cm^2$, while the ground-state absorption cross section of V:YAG at 1.34 μm is $7.2\times10^{-18}$ $cm^2$. This results in a cross-section ratio of 28, well above the factor of 10 that is generally considered adequate for efficient passive q-switching.

Figure 3:
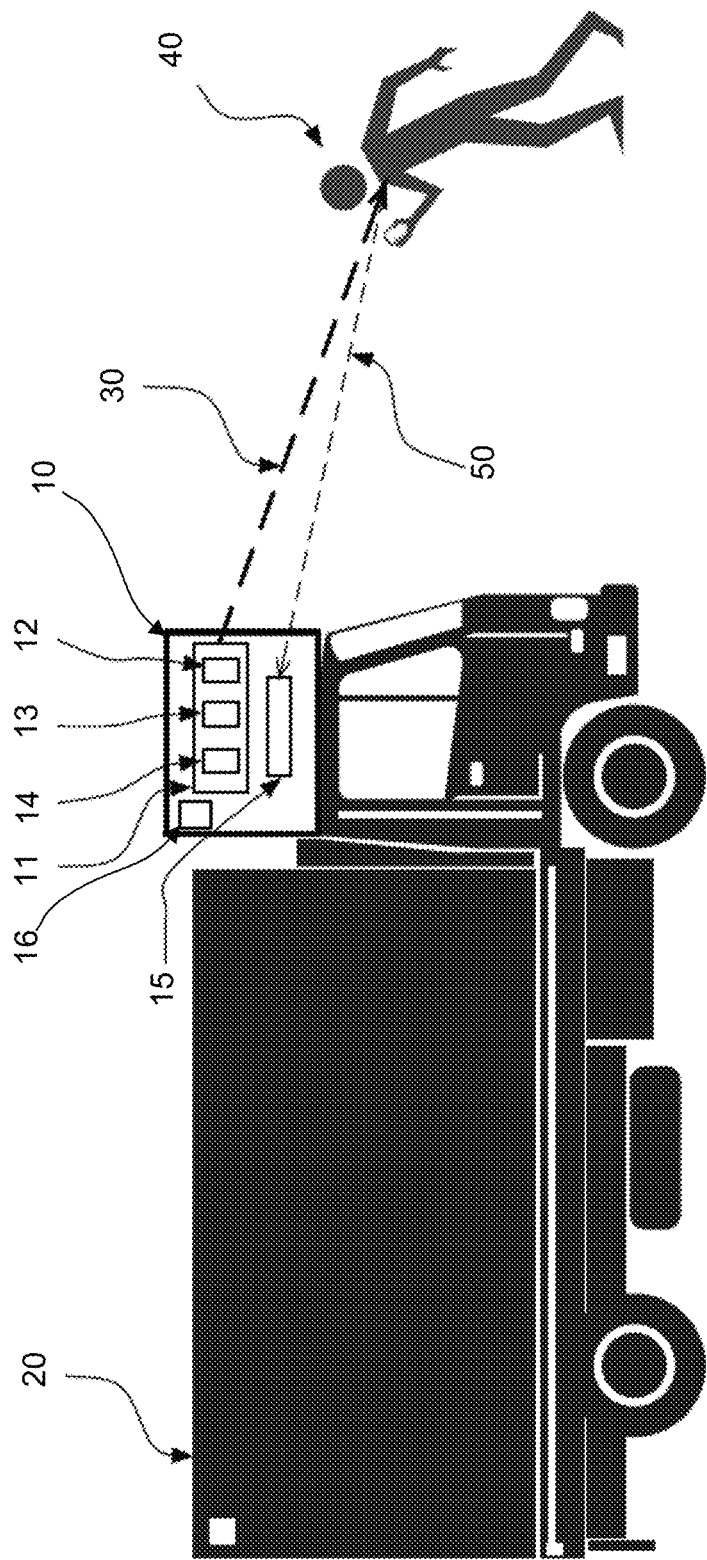
FIG. 3 is a schematic diagram of an exemplary laser ranging system using a passively Q-switched laser.

FIG. 3 shows a representative laser ranging system according to an embodiment of the present invention. The ranging system 10 may be mounted on a vehicle 20. The vehicle may be under human control or may be autonomous or semi-autonomous. The vehicle 20 and ranging system 10 may operate in an open environment, from which wildlife and humans are not excluded, such as a roadway. The vehicle 20, such as a truck or automobile operating at freeway speeds, needs to get useful range data at distances exceeding 1000 feet. If the vehicle is traveling at 70 mph, the time to travel 1000 feet is less than 10 seconds. The ranging system 10 includes a laser 11. The laser 11 includes a gain element 13 which has as its active dopant neodymium ions or some other ion capable of lasing in a wavelength window between approximately 1.2 and 1.4 microns. It also includes a saturable absorber 12 which has as its active dopant vanadium ions or some other material capable of acting as a saturable absorber in the 1.2 to 1.4 microns wavelength range. Power to pump the gain element 13 may be provided by a semiconductor laser 14. The semiconductor laser may operate in a continuous manner or the pump power delivered to the gain element 13 may be varied as desired. The laser 11 emits pulses of light in an output beam 30 in the wavelength range from 1.2 μm to 1.4 μm. The peak power of the emitted Q-switched pulsed can be many times greater than the maximum pump power. This is advantageous in laser ranging application in which peak power is very important.

A monitor senses emission of a laser pulse and provides a signal indicative of its emission. The target 40 to be measured by the ranging system 10 may include humans with unprotected eyes. Light pulse 30 emitted by the laser 11 may strike the target 40 and be scattered and reflected. Some of the scattered and reflected light 50 returns to a detector 15, which may be co-located with the laser 11 within the ranging system 10. The detector 15 senses the scattered and reflected light and provides a signal indicative of its arrival time. A determination of the difference in time between the emitted laser pulse and detection of the scattered and reflected light from the target may be made by a processor 16 using the signals from the monitor and detector. The time difference is then used to determine the distance to the target using the known speed of light. The output beam 30 may be scanned by a scanning system over a field of view so that a distance between multiple targets in the field of view may be determined. The scanning system may be integrated into the ranging system 10. There may be multiple targets in the field view and the processor 16 may be configured to discern the nature of the different targets in the field of view.

It should be also appreciated that any of the methods or operations described herein may be stored in a suitable computer readable medium in the form of executable computer code. The executable computer code can be stored in a memory that can include a non-transitory computer-readable medium on which instructions for performing all the methods and functions disclosed can be stored. The term "non-transitory computer-readable medium" can include a single medium or multiple media that store instructions, and can include any mechanism that stores information in a form readable by a computer, such as read-only memory (ROM), random-access memory (RAM), erasable programmable memory (EPROM and EEPROM), or flash memory.

The operations are carried out when the processor 16 executes the computer code. The processor 16 may determine a distance between a platform and a target. The processor 16 may cause a passively Q-switched laser mounted on the platform to be operated in a series of pulses, each pulse in the series of pulses having a wavelength between 1.2 and 1.4 microns. An axial mode structure of substantially all the pulses in the series of pulses of the passively Q-switched laser may be controlled by signals sent from the processor 16 to the passively Q-switched laser 11. A first signal representative of a time one pulse in the series of pulses is emitted from the passive Q-switched laser may be measured and recorded in the processor 16. A second signal representative of a time a reflection off the target of the one pulse in the series of pulses is received by a detector mounted on the platform may be measured and recorded in the processor 16. A distance between the platform and target may be determined based on a time difference measured by the processor 16 between the first signal and the second signal.

Aside from the basic functionality of determining the time difference or time interval between the emitted laser pulse and the return reflected signal from the target, the processor 16 may have other control functions, such as directing scanning of the output laser beam across a field of view. The processor 16 may also include logic that can discriminate between reflected signals from the target and background noise that may be present in the environment. For example, other laser ranging systems may be in the vicinity and may be emitting laser pulses at substantially the same wavelength. The processor 16 may be configured to identify these background signals and disregard them. The processor 16 may also direct the laser 11 to operate with different time intervals between the pulses in the series of pulses. The pulse interval characteristics of the series of pulses may form a code that helps to discriminate against background noise. Different methods of changing the time interval between pulses and producing a pulse code are described herein.

These methods include controlling the axial mode structure of the output pulses and adjusting the pump power on the gain element.

Figures 4, 5:
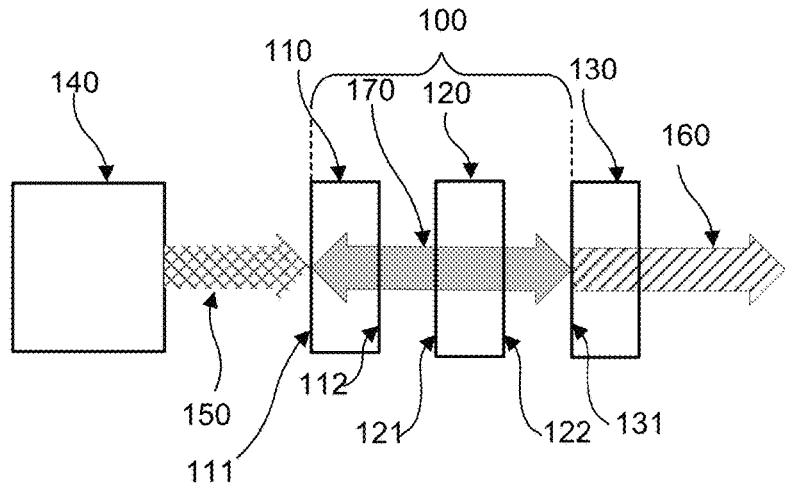
FIG. 4 is a schematic diagram of a prior art 1.3 micron, passively Q-switched laser.
FIG. 5 is a table summarizing experimentally achieved laser performance using a standard pump source, while varying the thickness of the V:YAG saturable absorber and the diameter of the pump.

FIG. 4 is a schematic diagram of a prior art laser resonator 100. A gain element 110 is a piece of Nd:YVO$_4$ crystal. Optical coatings are applied to the two large surfaces of the gain element 110. A first surface 111, which forms one end of the laser resonator, is coated for high transmission at a pump wavelength of approximately 0.81 μm, and for high reflection at a lasing wavelength of approximately 1.34 μm. A second surface 112, opposing the first surface 111, is coated for high transmission at 1.34 μm.

The laser resonator 100 contains a saturable absorber, which allows the laser resonator 100 to be passively Q-switched. Passive q-switching causes the laser resonator output to be a series of pulses rather than a continuous output. The pulses are generated by the laser resonator without any active control element, such as an acousto-optic or electro-optic modulator. The saturable absorber 120 in the laser resonator 100 is a thin piece of the crystalline material vanadium-doped YAG, or V:YAG. Both surfaces 121 and 122 of the V:YAG are coated for high transmission at 1.34 μm. A discrete output coupler 130 has an output coating 131 on its inner surface that forms one of the ends of the laser resonator 100. The output coating 131 reflects most of the resonant light 170 at the 1.34 μm lasing wavelength and couples out a portion to form the output beam 160. The resonant light 170 circulates between the first surface 111 of the gain element 110 and the output coating 131.

The laser resonator 100 is energized by pump light 150 emitted by a pump laser 140. Typical efficiencies of energy conversion to output pulsed light 160 are up to 30%.

While the prior art laser depicted in FIG. 4 has been demonstrated, prior art lasers have not been optimized for laser ranging applications, and no reported prior-art laser can achieve pulse length less than 10 nanoseconds and pulse repetition rate greater than 100 kHz simultaneously, as is needed for vehicular laser ranging applications. Described below are various modifications to the prior art laser depicted in FIG. 4, which improve the laser performance characteristics so as to make a passively Q-switched laser an attractive laser source for many laser ranging applications.

Design improvements to the prior art laser shown in FIG. 4 may be based on appropriate selection of the thickness of the saturable absorber and the diameter of the pump beam inside the gain element, and also the use of a short resonator. Some constraints are based on what pump sources are realistically available, for example a pump with a maximum output power of 3.5 watts from a fiber of diameter 105 microns. The beam from this fiber could be used with 1:1 magnification to maintain a diameter of 105 microns or with demagnification down to a diameter of 63 microns. Short laser resonators, with single-pass length less than 5 millimeters, were used. With a piece of V:YAG saturable absorber material of thickness 0.16 mm and absorption 2.5%, and a pump beam diameter of 63 microns, pulses of duration 4.8 nsec, pulse energy 0.43 microjoules, peak power 68 watts, and pulse repetition frequency 1.82 MHz were demonstrated. With a piece of V:YAG saturable absorber material of thickness 1.22 mm and absorption 21%, and a pump beam diameter of 105 microns, pulses of duration 1.08 nsec, pulse energy 2.5 microjoules, peak power 1750 watts, and pulse repetition frequency 24 kHz were demonstrated. The table of FIG. 5 shows the range of pulse duration, pulse energy, pulse repetition frequency, and peak power that was achieved by varying the thickness of the V:YAG and the diameter of the pump beam, while using a standard pump source and a resonator of length less than 5 millimeters.

One element to optimize is the gain element 110. In particular, its thickness and doping level must be properly selected. A typical thickness may be less than or equal to 1 millimeter or some smaller value such as approximately 0.5 mm, 0.4 mm, 0.3 mm, 0.2 mm or 0.1 mm. A doping level of the Nd ions in the crystal may be higher than is used for larger lasers, which are typically less than 1%. Doping of 2% or 3% will be appropriate for the gain crystal of the laser of this invention. The lateral dimensions may be small, since the beam cross-sectional area is small; a square of 5 mm×5 mm is convenient, but any size larger than approximately 0.5 mm×0.5 mm would work as well. A unique "c" crystallographic axis of the YVO$_4$ crystal may be oriented so that it may be substantially in the plane of the first surface 111 and second surface 112, which may be substantially parallel with each other. The gain element 110 may be shaped as a regular parallelepiped.

A parameter which can be varied to select the desired performance characteristics is small-signal, single-pass absorption of the vanadium ions in the V:YAG. In general, a larger absorption results in a lower repetition rate and shorter pulses. The thickness and doping level of the saturable absorber 120 may be chosen to get a desired saturable absorption of the 1.34 μm lasing light. If the absorption is too low, output pulses will be too long, and their energy and peak power will be low. If the absorption is too high, the system may not achieve threshold, and will not "lase." If it does lase, the pulse repetition rate may be too low, though output pulse length will be short, and energy will be high. For 5 nsec pulses, with a 5 mm resonator length, an absorption of 3% in a single pass is desired. This absorption results in an acceptable trade-off between pulse energy, pulse length, peak power, and repetition rate. This level of absorption may result in a very thin piece of V:YAG, such as a thickness less than 1.5 mm, 1.0 mm, 0.5 mm, 0.4 mm, 0.3 mm, 0.2 mm, or 0.1 mm.

The round-trip time of the light beam 170 in the laser resonator 100 should be made small in order to enable short pulse length. This can be done by making the resonator length short, with special attention to keeping the crystalline pieces short, since light travels slower in the crystals. A total resonator length of 5 mm or below, with each crystalline piece 1 mm or below, will enable pulse lengths which are short enough to make the laser useful for ranging.

The transverse diameter of the pump light beam 150 measured inside the gain element 110 can be minimized to enable a laser which can simultaneously have short pulses, high repetition rate, and adequate conversion efficiency. A pump beam diameter of less than 0.1 millimeters, or as low as 0.05 millimeters, in a laser with an adequately short resonator length, can enable the performance indicated by FIG. 5, or better. The pump beam diameter can be defined in many ways; for example, either a full width at one half maximum beam diameter, a full width at $1/e^2$ beam diameter, or a beam diameter enclosing 90% of the power. For clarity, the pump beam diameter herein will refer to a diameter of a circular area that encircles 90% of the beam power at a beam focus.

The transverse diameter of the pump light beam can be made small by using a pump laser 140 with a small emitting aperture, and by then selecting an optical demagnification system which minimizes beam diameter over the length of the gain element. For example, referring to FIG. 7, the pump light 150 may be transmitted thru demagnification optics 180 to form demagnified pump light 151. Pairs of aspheric molded lenses, selected so that the ratio of the focal lengths is equal to the desired demagnification factor, can provide an adequate optical demagnification system. For some pump sources, such as fiber-coupled pump sources, both transverse dimensions are the same, and both will be equally demagnified. For other pump sources, such as typical high-power edge-emitting laser diodes, the two dimensions are unequal, and only one will need to be demagnified. In this case, the lenses may have different focal lengths along two orthogonal axes. For example, the emitting aperture of a laser diode pump source may be approximately 100 microns by 1 micron. The 100 micron dimension may be demagnified by a factor of 2 to provide a 50 micron spot at the gain element 110. Depending on the details of the laser design, the demagnification factor may vary between approximately 1 and 5. In other embodiments, no demagnification is used and a laser diode may simply be positioned adjacent the first surface 111 of the gain element 110 without any intervening optical element. In still other embodiments, light from the pump source may be coupled to the gain element by an optical fiber. The fiber output may be butted up to the gain element or one or more lens may be situated between an output end of the optical fiber and the gain element.

If both surfaces 121 and 122 of the V:YAG are coated for high transmission of 1.34 μm light, then a discrete output coupler 130 is needed as shown in FIG. 4. The optional discrete output coupler 130 serves as an end mirror for the laser resonator 100. If used, an output coating 131 with a partial reflectivity at the laser wavelength is applied to a surface of the discrete output coupler 130 facing the saturable absorber 120. The output coating may have a transmission at the lasing wavelength in the range from 3% to 15%.

Figure 6:
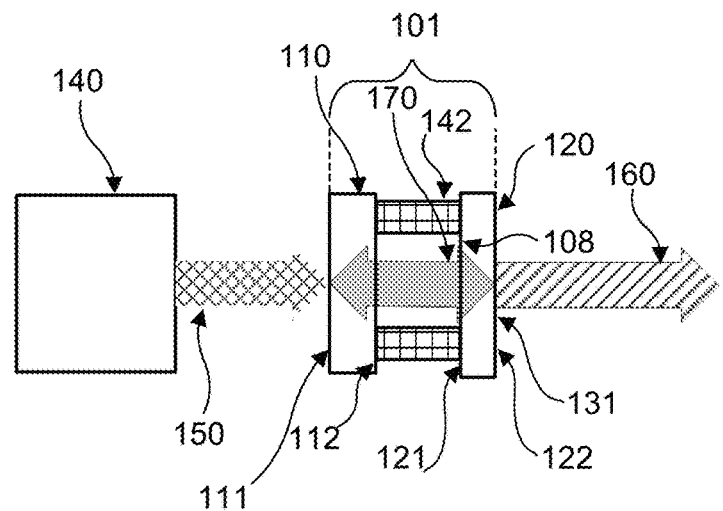
FIG. 6 is a schematic diagram of a 1.3 micron, passively Q-switched laser optimized for laser ranging according to an embodiment of the current invention.

If the discrete output coupler 130 is not used, then the output coating 131 may be applied to the second surface 122 of the saturable absorber 120. The second surface of the saturable absorber may be planar or curved in either a concave or convex manner. FIG. 6 depicts a laser resonator 100 that does not require a separate output coupler according to an embodiment of the current invention. A partially transmitting optical coating is applied to the second surface 122 of the saturable absorber so that it serves as an end mirror for the resonator 101. This laser resonator 101 may be more cost effective than laser resonators that require a separate output coupler, because the resonator has fewer elements. A particularly cost effective design may use a spacer 142 with the gain element 110 attached to a first side 106 of the spacer 142 and the saturable absorber 120 attached to a second, opposing side 108 of the spacer 142. The spacer 142 may be a plate with a hole, a tube, or any structure mechanically connecting the gain element 110 with the saturable absorber 120. The spacer 142 may have features that allow it to bend such that the alignment of the first surface 106 with the second surface 108 may be adjusted so as to change the alignment of the first surface 111 of the gain element 110 with the second surface 122 of the saturable absorber 120. The hole may be a straight thru hole or may be structured. At least some section of the hole may be sized as an aperture that provides for increased losses for higher order transverse modes and thus encourages single transverse mode operation. Advantageously, spacer 142 may also serve to seal the laser resonator volume from outside contamination that may degrade laser performance. The resonator volume may be completely sealed, such that it is isolated from the surrounding atmosphere or it may have a seal that allows pressure equalization between the resonator volume and surrounding atmosphere. The spacer 142 may alternatively mechanically connect the gain element 110 with a discrete output coupler 130 should a discrete output coupler 130 be used to form one end of the laser resonator 100.

The gain element 110, saturable absorber element 120, and coupling mirror 130 (if present) must be aligned so that the resonant light 170 reflects off of the two end mirror coatings and returns to the same point. This will be possible if all surfaces are parallel, or by aligning one or both of the reflecting faces to achieve the desired condition of a ray reflecting back on itself indefinitely.

Figure 7:
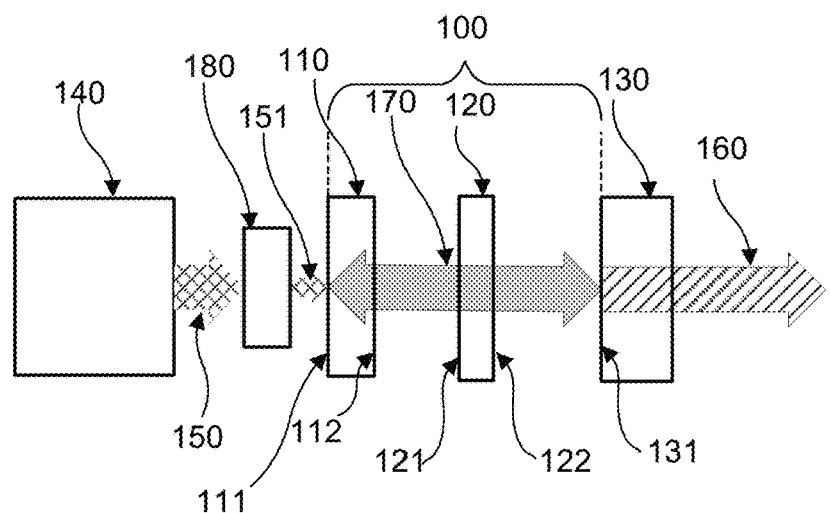
FIG. 7 is a schematic diagram of a 1.3 micron, passively Q-switched laser optimized for laser ranging according to an embodiment of the current invention.

FIG. 7 depicts a passively Q-switched laser operating near 1.3 microns optimized for use in laser ranging applications. The laser is similar to the prior art laser depicted in FIG. 4 and for brevity a description of the common elements will not be repeated here. One difference between the prior art laser depicted in FIG. 4 and the optimized laser depicted in FIG. 7 may be the gain element 110. In particular, the gain element 110 may be thinner and have a higher doping level of Nd ions than in the prior art lasers. Reasons for this difference are described in more detail below.

The large surfaces of the gain element 111 and 112 may be oriented parallel to the large surfaces of the saturable absorber element 121 and 122, or they may be oriented at an oblique angle. One of the three, equivalent, and mutually orthogonal <100> crystallographic axes of the V:YAG may be oriented parallel to the "c" axis of the $YVO_4$. Orientation tolerances may be relatively relaxed, for example, an error of 5° is acceptable.

If both surfaces 121 and 122 of the V:YAG are coated for high transmission of 1.34 μm light, then a discrete output coupling mirror 130 is needed. This mirror may have planar surfaces, or it may have a concave surface facing the crystal components, or it may have a slightly convex surface facing the crystal components. For lowest cost, a planar geometry is preferred. We have demonstrated that using a planar mirror results in good performance as described below. The output coating 131, whether on the coupling mirror 130 or second surface 122 should be partially reflecting for the wavelength of 1.34 μm; 97-85% reflectance with 3-15% transmission may be used.

The overall length of the resonator will be typically 10 mm or less, so that the pulses have a short time duration. Resonator lengths less than 5 mm may be particularly advantageous. Pulse widths well below 10 nsec, and even below 1 nsec, are possible with these short resonator lengths.

A pump laser 140 may be used to energize the laser resonator 100. The pump laser 140 will most commonly be at a wavelength of approximately 809 nm, though other wavelengths are possible. Preferably the pump laser is polarized, with the polarization parallel to the "c" crystallographic axis of the $Nd:YVO_4$. Lenses may be used to focus pump light 150 onto a small area on first surface 111 of the $Nd:YVO_4$ crystal. A typical pump area will be enclosed by a 100 μm diameter circle, although smaller and larger pump areas may be used. The diameter of the pump beam will be typically 125 microns or less, so that high repetition rates and good beam quality can be achieved with the short resonator. Pump beam diameters of less than 100 microns or 50 microns may be especially advantageous. Repetition rates above 300 kHz, and even above 1 MHz, are possible with this design. Here the pump area refers to a circular area on the first surface of the gain element 110 where more than 90% of the pump light is enclosed within the circular area.

A pump power of the pump laser will typically be 2 to 4 watts. At this power level, the expected power in the output beam 160 at a wavelength of approximately 1.34 µm will be around 0.1 to 1.0 watts. The range of repetition rate, pulse duration, pulse energy and peak power which have been achieved experimentally are shown in the table of FIG. 5. With further optimization, it is expected that any given parameter can be improved by a factor of 2. The output beam 160 will be polarized, and will be nearly diffraction-limited, with a value of the beam quality figure of merit, $M^2$, of less than or equal to 1.3, where 1 is the ideal limit. A beam with a $M^2$ of less than or equal to 1.3 may be considered a single transverse mode beam. Such a low divergence beam is desirable in laser ranging applications.

The V:YAG crystal may be prepared so that the charge of the vanadium ion is +3, to the highest degree possible, for example, more than 90% of the vanadium ions are in the +3 valance state, also known as the trivalent state. A <100> crystallographic axis of the YAG crystal, of which there are three, may be oriented so that it is substantially perpendicular to the plane of the large surfaces 121 and 122. A first surface 121 of the V:YAG crystal is coated for high transmission at 1.34 µm. A second surface 122 may have either the same coating, or it may be coated to function as the laser output coupler, in which case it coated for partial transmission at 1.34 µm. A typical partial transmission is 3-15%, that is 3-15% of the incident 1.34 µm light is transmitted and the other 85-97% is reflected.

Additional Features

The following sections describe specific issues with passively Q-switched lasers and specific design solutions which may enhance the utility of a ranging system based on these lasers.

Axial Mode Control

A laser resonator has an associated axial, or equivalently a longitudinal, mode spectrum. The spectrum is a series of peaks with intervening valleys as a function of wavelength or frequency. The peaks in the spectrum correspond to the condition that an optical wave making a round trip transit through the laser resonator will have the same phase as its initial phase. This condition is equivalent to a round trip optical path length through the laser resonator being an integer number of wavelengths long. The gain element will have a gain curve with a gain peak. The shape and location of the gain curve and gain peak is determined by the lasing dopant, the host material, and dopant/material temperature.

Figure 13A:
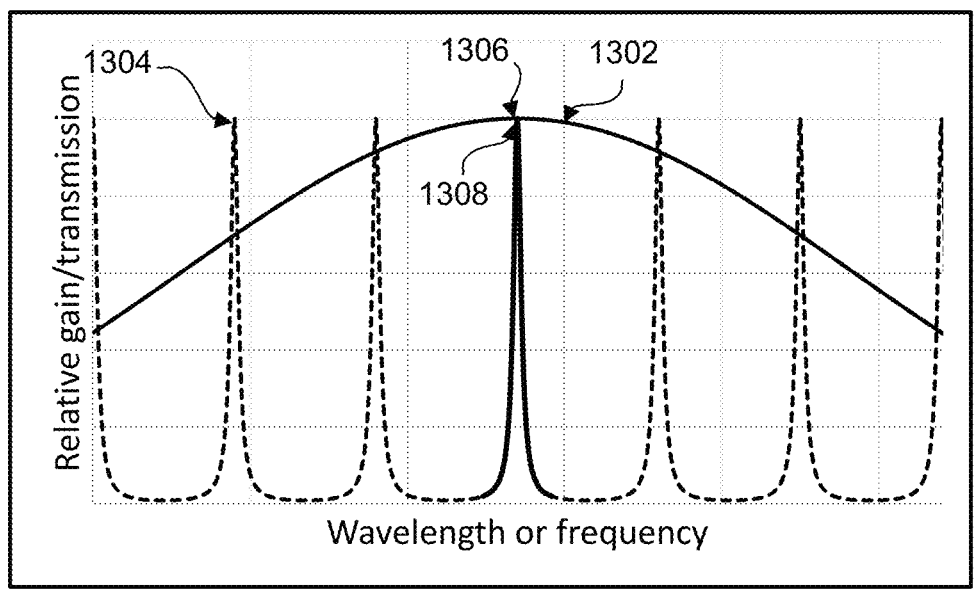
FIGS. 13A-13C are schematic graphical representations of laser gain in a gain element and an axial mode spectrum of a laser resonator for various alignments of the laser gain with the axial mode spectrum.
Figure 13B:
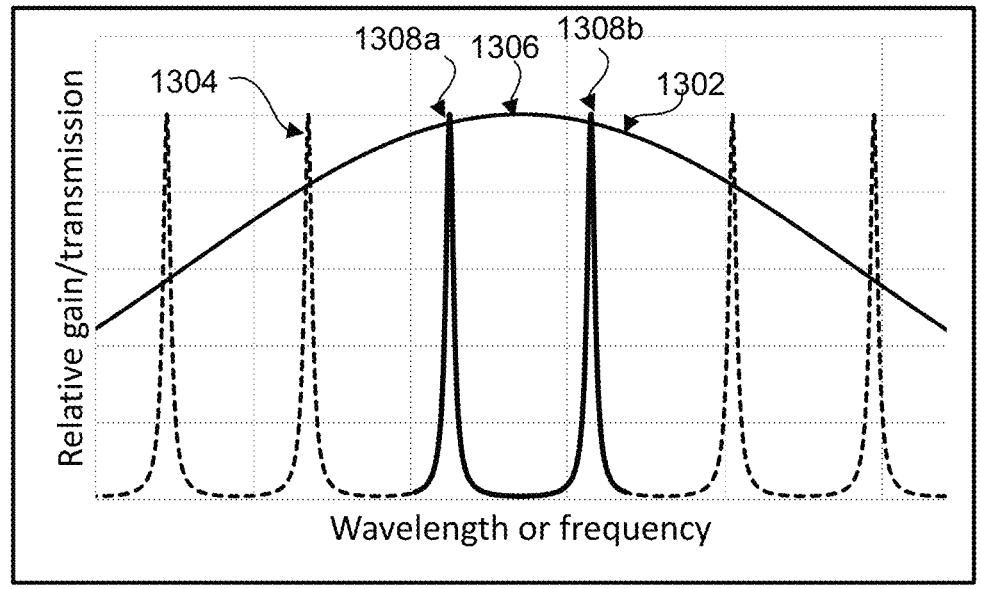

FIG. 13 schematically depicts a resonator axial mode spectrum 1304 and a gain curve 1302. In this case a peak in the laser gain curve 1306 is in alignment with a peak 1308 in the resonator axial mode spectrum 1304. In general, a laser will lase at a wavelength corresponding to one or more of the axial mode peaks 1304. In various embodiments described below the relative position of the axial mode peaks 1304 is shifted relative to the gain peak 1306 to obtain a desired axial mode structure in output pulses from a passively Q-switched laser.

In general, the pulse energy will vary from pulse to pulse, and the time interval between pulses will also vary. The amount of variation in both these parameters may be around 30%. This amount of variation does not make the laser unusable. But it is generally considered to be inconvenient and is generally not preferred.

By far the largest contributor to pulse energy and timing variation is the tendency of the laser to operate in more than one axial mode, or wavelength. From pulse to pulse, the wavelength may vary by a fraction of a nanometer. At different wavelengths there is different gain and accessible energy, so pulse energy and timing vary. A laser that operates substantially on a single axial mode will have much more consistent pulsing. Here substantially means that more than 90%, 95% or 98% of the output pulses in a series of laser pulses will have more than 90% of the pulse energy contained within a single axial mode. In other words, over a series of many pulses, for example, 1000 pulses, less than 100, 50, or 20 of the pulses will be multi-axial mode, respectively. The same axial mode may also be the lasing mode on more than 95% of the pulses in the series of pulses. The processor 16 (see FIG. 3) may recognize that some small fraction of the emitted pulses are multi-axial mode and make appropriate adjustments so that these multi-axial mode pulses do not compromise the ranging abilities of a laser ranging system in which the laser is incorporated.

One way to make a laser operate in a single axial mode is to force all of the gain into a region within a few hundred microns of the end of the laser resonator 100. When this is done, adjacent modes are suppressed, since the standing wave pattern of each mode is heavily overlapped in the gain region. To achieve this condition of strong absorption of pump light, the doping should be high, typically 2% or higher; the pump light should be linearly polarized parallel to the "c" axis of the Nd:YVO$_4$; and the pump wavelength should be near 809 nm, which corresponds to the peak of the Nd:YVO$_4$ absorption. To lock and narrow the pump wavelength a grating stabilized pump laser may be used. The grating may be either internal to the pump laser or may be positioned external to the pump laser cavity.

Single axial mode operation may be further enhanced by using either or both of the gain element and the saturable absorber as an etalon. Incorporating an etalon into the laser cavity may encourage single axial mode operation by increasing the loss for axial modes that are not aligned with a transmission maximum of the etalon. To use the gain element 110 as an etalon the second surface 112 may be coated or left uncoated so that it has an appreciable reflection at the laser wavelength, say 5%, 10%, 20%, or some similar value. This surface will then introduce a wavelength dependent loss within the laser resonator 100. The laser resonator will seek to lase at a laser wavelength where the loss is minimized. This corresponds to a null in a standing wave pattern that forms within the laser resonator being situated at the second surface 112. Similarly, the first surface 121 and second surface 122 of the saturable absorber 120 may have appreciable reflectivity at the lasing wavelength and may form an intra-cavity etalon. The thickness of one or both of the gain element 110 and saturable absorber element 120 may be selected so that the transmission maximum of these elements is situated at or close to the maximum gain of the gain element 110.

Yet another approach to single axial mode operation is to make the gain element 110 very thin, for example; less than 100 microns, 200 microns, 300 microns, 400 microns, 500 microns, or 600 microns. The gain element 110 in the pumped area may be free standing or it may be bonded to a transparent substrate that provides mechanical support for the thin gain element.

Yet another approach to single mode operation is to reduce the pulse repetition frequency to the point at which the time between pulses is comparable to or larger than the lifetime of the upper laser level of the Nd:YVO$_4$ laser material. The lifetime of the upper laser level is 61 microseconds for NdYVO$_4$ doped at 2%, and it can be made shorter by increasing doping. At repetition rates of 20 kHz and below, single axial mode operation may be possible. Operating at low repetition frequency may be accomplished either by reducing the pump level and maintaining continuous pumping, or by causing the pump laser to emit pulses by pulsing current to the pump laser. For example, referring to FIG. 5, the data of row number 7 resulted when the pump was pulsed in order to intentionally reduce repetition rate, and the laser operated in a single axial mode with stable, low-jitter output pulses.

Another approach to single mode operation is to shorten the length of the resonator to lengths of 5 mm or below, or even as low as 3, 2, or 1.5 mm. This approach moves the spacing between adjacent axial modes to larger values, so that undesired axial modes are at a wavelength or frequency which has less gain. The one, desired axial mode may be positioned as close a possible to the wavelength or frequency of having the highest gain.

Another approach to reducing timing jitter between successive Q-switched pulses in a series of Q-switched pulses is to allow two axial modes to oscillate. The wavelength of the two lasing axial modes may be positioned so that the two modes straddle the wavelength having highest gain. In this "straddle" condition, the two modes are equally and oppositely separated in wavelength from the wavelength of highest gain, so they will have equal gain, and thus equal energy and time between pulses. Half of all pulses will be on one axial mode, and half on the other axial mode. Pulses will alternate consistently between the two axial modes. The two modes draw from distinct but overlapping populations of atoms, due to the phenomenon of spatial hole burning. After a pulse on a first axial mode, the population of that mode is preferentially depleted, so the next pulse will be on a second mode axial different than the first axial mode. This causes the lasing mode alternation to be regular, with almost no randomness. Since, ignoring depletion, both axial modes have the same gain, and since they are alternating regularly, pulses on both modes will have the same energy and the same period between pulses. This will result in a laser output having much less pulse energy variation and timing jitter than would be the case for a laser with several lasing modes, or a two-axial-mode laser with one mode closer to the peak of gain than the other. The two axial mode operating described herein is characterized by more than 90%, 95% or 98% of the output pulses in a series of laser pulses alternating between lasing on a first axial mode and a second, different, axial mode. Each pulse will have more than 90% of the pulse energy in either the first or second axial mode.

When single-axial-mode operation is achieved the variation in pulse energy and time interval between adjacent pulses may be typically 2% or less. An equivalent, low amount of variation can be achieved with two modes positioned in wavelength so as to straddle the wavelength of maximum gain.

Axial Mode Control

As noted above, control of the axial mode structure of a passively Q-switched laser is desirable to obtain desired pulse output characteristics, such as timing jitter and pulse energy stability. The axial mode structure of lasing pulses may be controlled by controlling the resonator length to shift the resonator axial mode spectrum relative to a gain peak of the gain element. Single-axial-mode operation is more likely to be achieved when one mode is made dominant, by placing that mode at the wavelength which is at the peak of the laser gain, as is diagramed in FIG. 13A. In this case only a single axial mode 1308 will lase. Balanced two-axial-mode operation can be achieved when two axial modes are equally and oppositely offset from the peak of the laser gain. This situation is diagramed in FIG. 13B. In this case the gain curve 1302 and gain peak 1306 are unchanged from FIG. 13A, but the axial mode spectrum 1304 has shifted. Axial modes 1308a and 1308b are equally spaced from the peak of the gain peak 1306 and both modes will lase on alternate pulses. That is on a first pulse axial mode 1308a will lase, on a second pulse immediately following the first pulse, axial mode 1308b will lase, on the next pulse mode 1308a will lase, and so on.

Both the single axial mode and two axial mode operation can be established and maintained by changing the optical path length of the laser resonator, which shifts the position of the axial mode spectrum 1304. This may be done by changing the physical length of the resonator or changing the optical path length in the gain or saturable absorber element. A change in resonator length of ¼ wavelength, which is 0.33 µm for a wavelength of 1.34 µm, is enough to move the laser from the condition of one, centered mode, to two modes straddling the gain curve, with equal gain. In some embodiments, it may be desirable to achieve and maintain the single, centered mode condition or the two, straddling mode condition. In these embodiments, operating in a range of intermediate cases is undesirable, since the output is more unstable. As described below, in other embodiments more unstable operation may be desired, and the resonator length may be controlled to have a more unstable axial mode structure. Control of the resonator length to achieve a desired axial mode structure is difficult, since a length change of 0.33 µm is a small change. Precision control and stabilization of resonator length to sub-micron tolerances is desirable.

One approach to control the resonator length is to use temperature to change the length of the resonator. For a 5-mm long resonator, with the spacing structure made of aluminum, an expansion of 0.33 µm will result from a temperature change of 5 C. By selecting a temperature at which a single mode is well-centered and thus dominant, and then stabilizing that temperature within a degree or so, stable single-mode operation can be ensured. A similar situation applies when two, straddling modes need to be stabilized.

Figure 8:
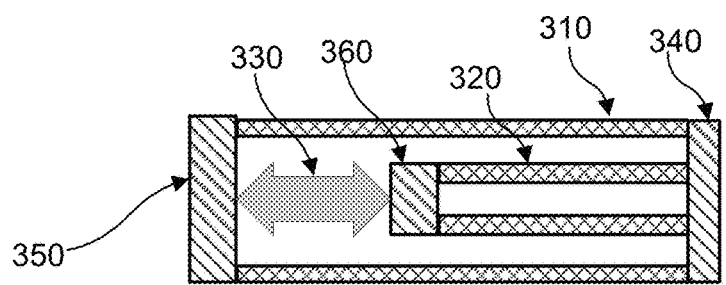
FIG. 8 is a schematic diagram of a temperature compensated 1.3 micron, passively Q-switched laser optimized for laser ranging according to an embodiment of the current invention.

The requirement for temperature stabilization adds cost and complexity. In some embodiments it may be desired to design a resonator structure that will not change length with temperature. This can be done by fabricating the resonator structure from a material with a low thermal expansion coefficient, such as invar or fused silica. Alternatively, length stabilization can be done by using two materials, in a compensating arrangement, such as shown in FIG. 8. By fabricating the resonator structure so that the resonator length is passively controlled and substantially independent of temperature, the axial mode spectrum can be controlled relative to the gain peak of the gain element.

A longer spacer 310 is made with a material having a lower thermal expansion coefficient, and a shorter spacer 320 is made with a material having a higher thermal expansion coefficient. The resonator is constructed so that its length 330 is determined by the difference in length between the two spacers. The two spacers are coupled together by a coupling 340 in such a way that the longer, lower-expanding spacer lengthens the resonator when it heats, while the shorter, higher-expanding spacer shortens the resonator. Since they push the resonator mirrors 350 and 360 in opposite directions as they expand, the lengths and materials can be chosen to keep the laser resonator length constant even as temperature changes.

The expansion of the gain and saturable absorber elements themselves may be significant, and the center wavelength of the laser gain may also change with temperature. Also the index of refraction can change with temperature. The proper choice of materials can compensate for these factors also, keeping a mode of the laser operating well-centered on the wavelength of maximum gain. For example, in Nd:YAG, where the value is known, the center of the gain peak of the 1064 nm line changes with temperature with a coefficient of about negative 1 gigahertz per degree centigrade, corresponding to an increase in wavelength of about +3.6 parts per million per degree. If the resonator can be designed so that its length expands at this same rate, then a lasing mode will shift wavelength with temperature in such a way that it remains at the same distance in wavelength relative to the wavelength of peak gain.

In another embodiment the spacer 310 may be made entirely or partially from a piezoelectric material. The length of the spacer 310 will change depending on an electrical voltage applied to the spacer. By changing the applied voltage, the spacer length may be controlled so as to position the axial mode spectrum of the laser resonator with respect to the laser gain peak as desired.

Figure 14:
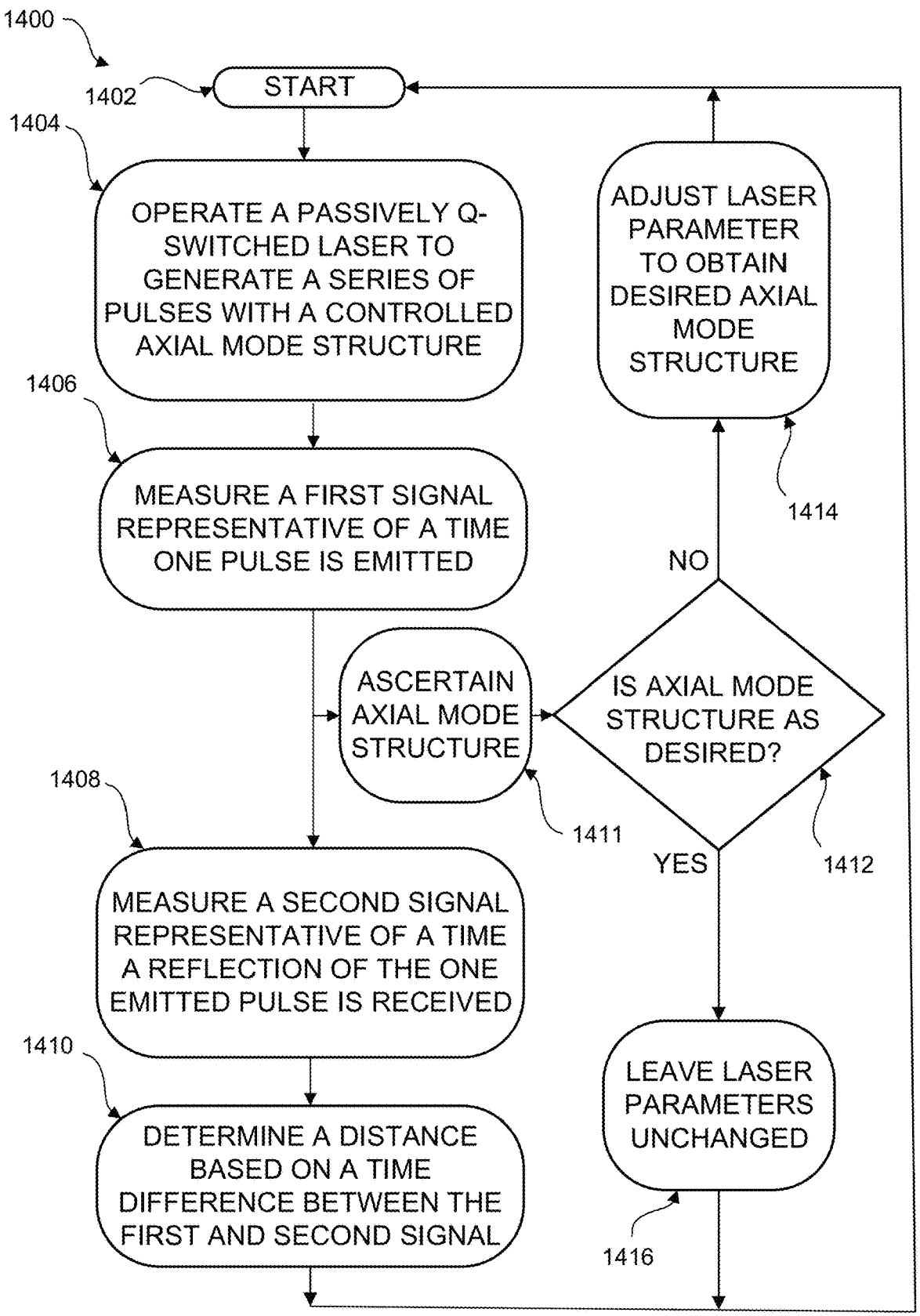
FIG. 14 is a flowchart depicting a method of measuring a distance according to an embodiment of the current invention.

FIG. 14 shows a flow chart 1400 that depicts a method of determining a distance according to an embodiment of the current invention. The flow chart 1400 starts at step 1402. At step 1404 a passively Q-switched laser is operated to generate a series of pulses with a controlled axial mode structure. The controlled axial mode structure may be either single axial mode, two axial mode, or multi axial mode. At step 1406 a first signal is measured, which is representative of a time one pulse in the series of pulses is emitted. In addition to the time the one pulse was emitted, the measurement may optionally include a pulse energy and/or pulse duration of the one emitted pulse. The flow chart 1400 may fork into two paths after completion of step 1406. One fork proceeds to step 1408 in which a second signal representative of a time a reflection of the one emitted pulse is received. At step 1410 a distance may be determined based on a time difference between the first and second signal. The path then returns to the start 1402. The other path following step 1406 proceeds to step 1411. At step 1411 the axial mode structure of the one pulse is ascertained. The axial mode structure may be ascertained by monitoring the laser parameters of one or more pulses emitted prior to the one pulse. These laser parameters can include the time interval between pulses, the pulse energy, and the pulse duration. The path then proceeds to step 1412 in which a determination is made whether the axial mode structure is the desired axial mode structure. If the axial mode structure is the desired axial mode structure, the path proceeds to step 1416 in which laser parameters are left unchanged. The path then returns to start 1402. If the axial mode structure is not the desired axial mode structure, the path proceeds to step 1414 in which the laser parameters are adjusted to achieve the desired axial mode structure. The laser parameters that may be adjusted in step 1414 include the pump power and/or the resonator length. The path then again returns to start 1402. The method of determining a distance depicted in flowchart 1400 may be repeated for each pulse in a series of pulses emitted by the passively Q-switched laser.

The method depicted in flowchart 1400 uses measurement of some parameter of the laser output, such as, time interval between successive pulses, pulse energy of successive pulses, or pulse duration of successive laser pulses, to infer an axial mode structure of the laser output. This measurement is used as part of a feedback loop to adjust the axial mode structure to a desired state.

Flat/Flat Resonator

A resonator with only planar surfaces is simple and may be less expensive to produce and build. An advantage of an all-planar resonator is that the requirement for positioning the pump beam within the resonator is greatly relaxed. For an all-planar resonator, the pump can be positioned anywhere on the pumped face, which may be a few millimeters in size; for a resonator with a curved reflecting surface it cannot. A typical tolerance on pump positioning for a resonator with curved optics is a few 10's of microns.

Gain Element Cooling

When the Nd:YVO$_4$ crystal is thin, <1.5 mm, and the pump power is high, >2 watts, and the pumped region is as small, <100 µm in diameter, the Nd:YVO$_4$ can get quite hot in the pumped region. It is not uncommon for temperatures to reach 200 C. At this temperature, efficiency drops, and gain broadens, so single-frequency operation is more difficult.

Figure 9:
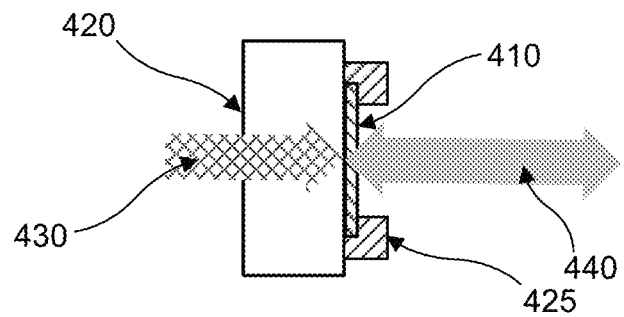
FIG. 9 is a schematic diagram of a technique for removing heat via a transparent element from the pumped laser gain element of a laser source for a laser ranging system according to an embodiment of the current invention.
Figure 10:
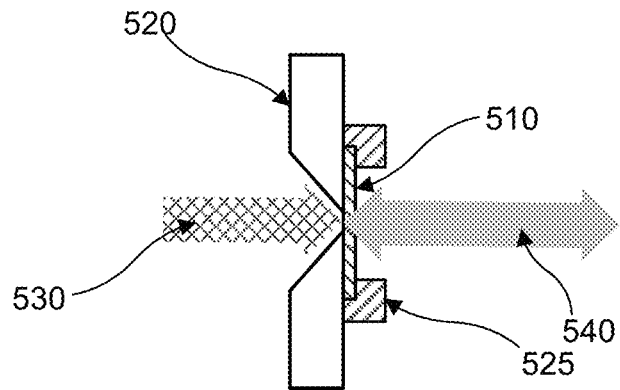
FIG. 10 is a schematic diagram of a technique for removing heat via a metal element from the pumped laser gain element of a laser source for a laser ranging system according to an embodiment of the current invention.

In order to cool the Nd:YVO$_4$ crystal it is necessary to provide a path for heat removal that is as direct as possible from the pumped region of the laser gain element 110. FIGS. 9 and 10 show two approaches for enhancing heat removal. In FIG. 9, the Nd:YVO$_4$ gain element 410 may be pressed against a transparent block 420 by a clamp 425. The transparent block 420 may be formed from sapphire, Al$_2$O$_3$, or some other high thermal conductivity material. The superior heat conduction and the larger thickness of the block 420 provides a direct heat removal path out of the Nd:YVO$_4$. The block 420 is outside of the laser resonator, so its optical properties do not impact the laser resonator. The sapphire block 420 transmits a pump beam 430 but does not interact with 1.3 µm laser light 440.

FIG. 10 show an alternative approach to gain element cooling. A Nd:YVO$_4$ gain element 510 may be pressed against a metal heat sink 520. A small hole, which may be conically shaped, in the metal heat sink 520 allows passage of pump light 530. Once again, a direct heat flow path from the pumped region of the gain element is provided so that the pumped region operating temperature is reduced.

Stabilizing Pulse Repetition Frequency by Control of Pump Current

As previously described, much of the variation in pulse-to-pulse timing is due to operation on variable axial modes. If single-axial-mode operation is assured, the remaining variation in pulse timing is random. Some of this randomness cannot be eliminated. For ranging systems, it will be necessary to measure the time of the outgoing pulse or a parameter related to that time, so that the time between the pulse emission and detection of a reflected signal can be determined. Measurement of the pulse time is a necessary trade-off for the lower cost of passively Q-switched lasers compared to actively controlled lasers system where the pulse timing may be inferred from a signal that triggers pulse emission.

However, the variation in pulse timing, called the pulse timing jitter, can be greatly reduced. Especially a slow drift of the pulse timing can be essentially eliminated. This can be done by observing pulse timing, and then controlling the optical pumping power to keep the pulse timing constant. This is called "frequency locking" the pulse train. The pump power can be readily adjusted by controlling a drive current to the semiconductor pump laser. The drive current can be either adjusted continuously, with the pulse interval increasing as the current is reduced, or it can be implemented by turning off the drive current between pulses, so that exactly one laser pulse can be achieved in each time interval.

Pumping Using a Pump Beam with a Small Focused Spot

For laser ranging applications, energy per pulse and the pulse repetition rate are important parameters. For a given average power they vary inversely from each other, since the product of pulse energy and repetition rate must equal the average power of the laser. For a given pump power, the pump beam diameter can be chosen to yield a higher repetition rate or higher pulse energy. By using a pump source with a small source area and divergence, and using optics which de-magnify the pump beam, the pump area can be made very small. A small pump beam will result in smaller pulse energy and a higher repetition rate, with no change in pulse length. For high repetition rate applications, a smaller pump beam is desirable. Also, the smaller pump beam will allow for a shorter resonator without the onset of high order transverse modes. These transverse modes may result in greatly reduced pulse energy stability and in a beam that changes shape from pulse to pulse, with some pulses no longer being diffraction-limited. This is unacceptable in most applications. Acceptable performance with a resonator of length less than 10 mm requires a pump beam diameter of 150 µm or less. Pump beam diameters of less than 100 microns or 50 microns may be especially advantageous. Generally the pump spot diameter may be chosen so that it is less than 50 microns, 75 microns, 100 microns, 125 microns, or 150 microns, with the pump spot diameter selected based on the pump power, resonator length, and other laser parameters. Repetition rates above 300 kHz, and even above 1 MHz, are possible with this design. Here the pump area refers to a circular area on the first surface of the gain element 110 where 90% of the pump light is enclosed within the circular area.

Short Resonator

All other things equal, the pulse length is proportional to the resonator round trip time. When pulse length is short, the peak power goes up, since pulse energy remains constant. Short pulses and high peak power are desirable, up to the point where the pulse length matches the response time of the detector in the ranging system. A short round-trip time is accomplished by reducing the length of the resonator, both by making the gain element and saturable absorber thinner and by eliminating any air spaces. The disadvantage of a short resonator is that at some point the laser will resonate in multiple transverse modes. This can be avoided to some extent by making the pump beam smaller, as described in the previous section. The tendency to operate on multiple transverse modes may also be reduced or eliminated by placing an aperture or opaque edge in the cavity, which increases the loss for higher order transverse modes and thus encourages single transverse mode operation. A resonator length below 10 millimeters, and preferably below 5 millimeters, will enable lasers with excellent properties for use in laser ranging systems.

Curvature of Resonator Mirrors

Controlling the curvature of the mirrors which define the resonator causes a change in the point at which transverse modes appear. What is desired is a design which for a given pump power and pump beam has the shortest possible resonator which does not result in transverse modes. A resonator with concave mirrors facing inward toward the interior of the resonator will have transverse modes at lower pump power levels than a resonator made up of planar mirrors only. A resonator with a convex mirror facing inward will have a great resistance to transverse modes, but a higher lasing threshold. A conventional way to create a convex mirror is to shape it in the process of grinding it and polishing it to shape. Another way, which works only for thin optics, is to have a coating which is under strain. If a coating applied to the V:YAG which acts as an output coupler is under tensile strain, then a thin piece of V:YAG will compensate for the strain by taking on a convex shape, as seen looking into the face opposite the coated face. Since planar pieces are much cheaper to make than curved pieces, and since the coating needs to be applied in any case, the use of a controlled amount of coating strain may be a cost-effective method to make a curved mirror.

Polarization-Combined Lasers with Same Pulse Repetition Frequency but Variable Relative Timing When vehicle ranging systems are in use by the millions, it will be important to keep systems operating near each other from confusing each other. A system should ignore pulses which are from another system. One way to do this is to use a small group of pulses, with the timing between pulses varied from unit to unit. If a particular unit sees a group of pulses which are not separated in time the way its own pulses are, it ignores them. A particular pattern of pulses is called a "code" and systems accept only their own code.

Figure 11:
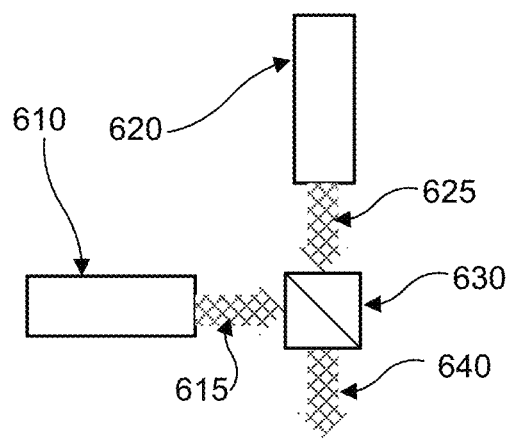
FIG. 11 is a schematic diagram of a laser source for a laser ranging system that uses two polarization multiplexed lasers according to an embodiment of the current invention.

This may be more difficult to do for a passively Q-switched system, since pulses cannot be created "on demand" by electronic means. FIG. 11 shows a technique for creating a laser source with two pulses, which may be separated by a controllable amount. Two lasers 610, 620 of any of the types previously described may be polarization-combined with a polarization beam combiner 630, so that they create a single beam 640. The time between the two output pulses can be controlled by the techniques described above. This is equivalent to a pulse code with two pulses. Since the time between pulses is on the order of a microsecond, and the pulse duration is on the order of a nanosecond, several hundred distinct "codes" can be created, greatly reducing the chance of interference between nearby systems.

Figure 12:
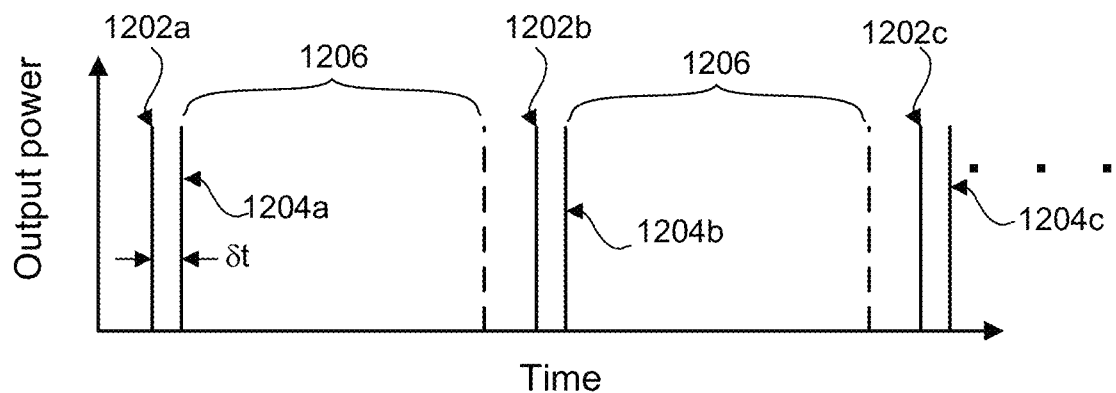
FIG. 12 illustrates the concept of operating with a laser ranging system with a coded output according to an embodiment of the current invention.

FIG. 12 illustrates the concept of operating with a laser ranging system with a coded output. In FIG. 12 the vertical axis is laser power and the horizontal axis is time. For clarity, laser pulses 1202*a*, 1202*b*, 1202*c*, 1204*a*, 1204*b*, 1204*c* are shown as vertical lines. The output of the laser ranging is a series of pulses. The pulses may be divided into a first set of laser pulses 1202*a*, 1202*b*, and 1202*c* and a second set of pulses 1204*a*, 1204*b*, 1204*c*. The second set of pulses follows the first set of pulses with a time delay δt. The time delay δt can be adjusted over the timing window 1206, such that the second set of pulses has a controllable time delay relative to the first set of pulses. The time between pulses in the first set of pulses may be approximately 1000 times greater than the width of the individual pulses. Therefore, there may be hundreds of resolvable distinct time delays between two sets of pulses.

In operation, the laser ranging may detect if another nearby ranging system has the same or similar time delay between its first set of pulses and second set of pulses. If so, the laser ranging may shift its time delay to a new different time delay to avoid interference with the nearby system.

Multi-Mode Laser with Variable Relative Timing

Figure 13C:
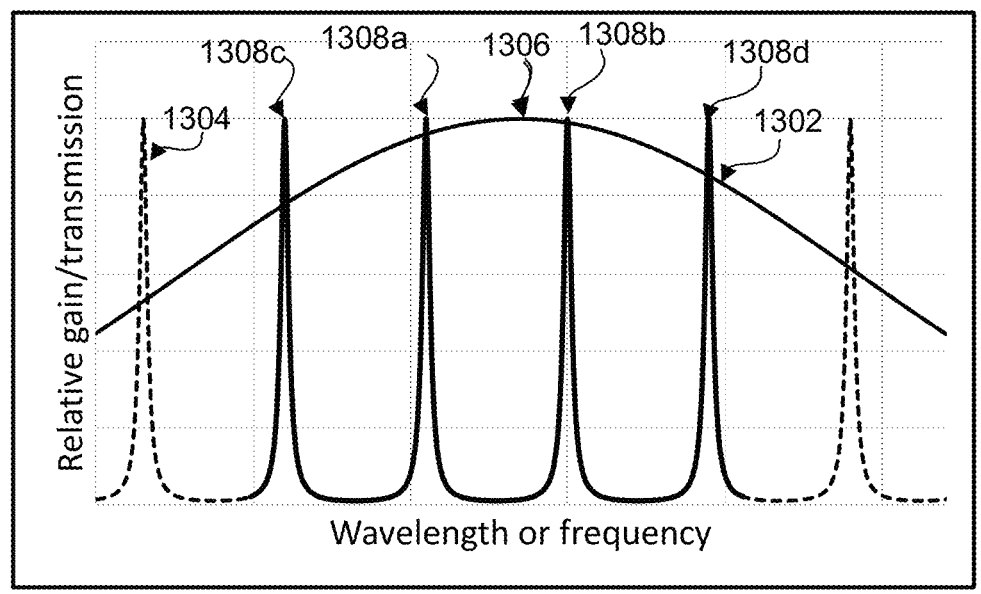

Another way to create a laser with a distinct code is to intentionally make the laser be a multi-axial-mode laser such that the laser lases on distinct axial modes on distinct pulses. This situation is depicted in FIG. 13C, which shows the gain peak 1306 asymmetrically situated between two axial mode peaks 1308*a* and 1308*b*. In this case successive pulses in a series of output pulses will have a varying axial mode structure. For example, successive pulses may lase on four different axial modes, 1308*a*, 1308*b*, 108*c*, and 1308*d*, or some combination thereof. In other situations, more or fewer axial modes may lase. There will be varying time intervals between successive pulses and the pulse energy and pulse duration may also be variable. The pulse intervals may or may not be controllable, though the average interval over many pulses will be controllable by control of the pump laser. The variable pulse timing will probably be distinct from the pulse timing of any other laser. A system discriminator that may be incorporated in the processor 16, will be able to distinguish a sequence of pulses created by its own laser from those created by another laser. The effective number of codes may be large, since the pulse patterns of multi-mode lasers are complex with successive pulses having varying time intervals between successive pulses. The effective number of pulses in a code could be doubled by polarization-combining two multi-mode lasers.

High Output Coupling

Usually, a laser designer chooses the output coupling—that is, the transmission of the mirror that transmits the laser light out of the resonator—to maximize laser efficiency. However, when single-mode operation is desired, the output coupling may be increased well above the amount which would optimize efficiency. This will suppress multimode operation. For example, an output coupling of 10% transmission might optimize efficiency. But at 25% transmission, higher single-mode power would be possible, though at somewhat reduced efficiency.

Wavelength-Stabilized Pump

For best operation, the pump laser wavelength needs to be in a range about 5 nanometers wide, near 809 nm. This is easily accomplished by stabilizing the temperature of the laser diode, with a tolerance of roughly ±7 C. While this is not difficult, it is undesirable in many applications, especially automotive applications, where devices must work over a very wide range of temperatures. The use of thermoelectric coolers, or fluid cooling, are possible, but add cost and complexity.

More desirable would be a pump laser that was stable in wavelength over a wide range of temperatures. One way of stabilizing a semiconductor laser is by using a wavelength dependent output coupling, such as a grating or Bragg reflector. The range over which stabilization is possible can be augmented by designing the semiconductor to have gain over wide range of wavelengths.

Embodiments described herein include a laser resonator comprising: a gain element having a first and a second surface, the first surface having a highly reflective coating at a lasing wavelength between 1.2 and 1.4 microns to form a first end of the resonator, a saturable absorber element, and a second end of the resonator. The second end of the resonator is formed by a second surface having a partially transmitting optical coating at the lasing wavelength between 1.2 and 1.4 microns. The gain element and saturable absorber element are mechanically connected by one or more spacers. The gain element may have a thickness selected from a group consisting of less than 0.6 mm, 0.5 mm, 0.4 mm, 0.3 mm, 0.2 mm, and 0.1 mm. The gain element may be shaped as a rectangular parallelepiped having a thickness that is less than a height or width of the rectangular parallelepiped. The saturable absorber element may be V:YAG and the-V:YAG saturable absorber element may be prepared so that the charge of the vanadium ion is +3, to the highest degree possible. The saturable absorber element may also be shaped as a rectangular parallelepiped having a thickness that is less than a height or width of the rectangular parallelepiped. The V:YAG crystal <111> crystallographic axis may be oriented so that it is substantially parallel to the thickness of the saturable absorber element. The saturable absorber element may have a thickness selected from a group consisting of less than 0.5 mm, 0.4 mm, 0.3 mm, 0.2 mm, and 0.1 mm. The laser resonator may have at least one of the gain element or the saturable absorber element form an etalon. The gain element may be pumped by a pump beam emitted by a laser diode. A pump spot size on the first surface of the gain element may be less than 100 microns in diameter. The laser resonator length may be less than 5 mm and it may be passively stabilized or actively controlled to position the axial mode spectrum at a desired position relative to the gain peak of the gain element. The one or more spacers may be a single spacer formed from a material chosen to have a low thermal expansion coefficient or it may be formed from a piezoelectric material. The one or more spacers may be a single spacer whose temperature is controlled. The one or more spacers may be two spacers, a longer spacer and a shorter spacer, wherein the longer spacer is made with a material having a lower thermal expansion coefficient, and the shorter spacer is made with a material having a higher thermal expansion coefficient. The longer spacer may mechanically connect the gain element to a coupling and the shorter spacer may mechanically connect the saturable absorber to the coupling. The second end of the resonator may be on a discrete output coupler or on the saturable absorber element. The second surface may be planar or curved. The curvature may result from strain of the partially transmitting optical coating on the second surface. The laser resonator may further comprise an aperture that encourages operation on a single transverse mode. The laser resonator may further comprise a heat sink mechanically coupled to the gain element. The heat sink may be a metal block with a hole or a transparent block positioned outside of the laser resonator. If the heat sink is a transparent block, it may be made of sapphire. The spacer may be bent so as to place the gain element and the saturable absorber element in proper alignment. The spacer, the gain element, and the saturable absorber may form a sealed enclosure that isolates the laser resonator from a surrounding environment. If the laser resonator is sealed it may include features that allow a pressure within the sealed enclosure to equalize with a pressure in the surrounding environment. The spacer may include the features that allow the pressure within the sealed enclosure to equalize with the pressure in the surrounding environment. For example, the spacer may have a small opening that is covered by a flexible member. The flexible membrane can expand and contract in response to pressure changes in the surrounding environment so as to equalize the pressure between the enclosure and surrounding environment.

Other embodiments described herein include a laser ranging system mounted on a platform comprising: a passively Q-switched laser operating in a pulsed manner to generate an output beam consisting of a set of laser pulses at a wavelength between 1.2 and 1.4 microns, wherein the set of pulses forms at least part of a code of pulses; a first pulse detection system for measuring a first signal representative of a time each pulse in the set of pulses is emitted from the laser; a second pulse detection system for measuring a second signal representative of a time a reflection of each pulse in the first set of pulses off a target is received by a detector situated adjacent to the laser; a processor that compares the first and second signals to verify that the second signal is consistent with the code of pulses; and determining a distance between the laser and the target based on a time difference between the first signal and the second signal. The platform may be selected from a group of moving platforms consisting an automobile, a truck, a locomotive, a ship, an airplane, and a drone. In some cases the platform may be stationary. The laser produces an output beam which may be scanned over a field of view. The laser ranging system may further comprise a second passively Q-switched laser that produces a set of laser pulses.

Other embodiments described herein include a method of determining a distance between a laser ranging system and a target, the method comprising: operating a first laser in a pulsed manner to generate a first output beam consisting of a first set of laser pulses at a wavelength between 1.2 and 1.4 microns, wherein the first output beam forms at least part of a code of pulses; measuring a first signal representative of a time a pulse is emitted from the first laser; measuring a second signal representative of a time a reflection of the pulse off the target is received by a detector situated adjacent to the laser; verifying that the second signal is consistent with the code of pulses; and determining a distance between the laser and the target based on a time difference between the first signal and the second signal. The first laser may be a passively Q-switched laser. A pulse repetition rate of the first set of laser pulses may be controlled by adjusting the pump power to the laser. The first output beam may have a $M^2$ transverse beam quality figure of merit less than or equal to 1.3. Substantially all the pulses in the first set of pulses may have a single axial mode structure. Substantially all the pulses in the first set of pulses may operate on substantially the same axial mode. Substantially all the pulses in the first set of pulses may operate alternately on two different axial modes. A time between successive pulses in the series of pulses may be substantially uniform. The first laser may operate on multiple axial modes causing the time between successive laser pulses to vary forming the code of pulses. A second passively Q-switched laser may be used to help determine the distance. An output beam of the second laser may be polarization combined with the output beam of the first laser such that they are substantially colinear. The output beam of the second laser may be a second set of pulses. A time delay between the first set of laser pulses and the second set of laser pulses may be controlled so as to form the code of pulses. The first output beam and optional second output beam may be scanned over a field of view. A distance between multiple targets in the field of view may be determined.

Although only a few embodiments of the invention have been described in detail, it should be appreciated that the invention may be implemented in many other forms without departing from the spirit or scope of the invention. The invention has been described primarily as a laser ranging system for a vehicle; however, the ranging system may be used in other platforms. The ranging system may be used in other moving platforms, such as a locomotive, ship, airplane, or unmanned drone. It may also be used in stationary applications, such as to determine the shape and layout of a structure, such as a building, bridge, or industrial facility, or to observe moving vehicles from a fixed location, such as a traffic intersection or airport taxiway. The saturable absorber element has been described as a V:YAG crystal, but the saturable absorber element may take other forms. For example, the saturable absorber element may be a semiconductor material with a series of epitaxially grown layers forming a saturable absorber structure. The lasing wavelength has been described as being between 1.2 and 1.4 microns. While this wavelength range is advantageous in laser ranging applications, the invention may be applied to other wavelengths, such as the lasers operating between 1.0 and 1.1 micron. Therefore, the present embodiments should be considered illustrative and not restrictive and the invention is not to be limited to the details given herein.

What is claimed is:

1. A passively Q-switched laser configured to output a series of output pulses in an output beam at an eye-safe lasing wavelength, the passively Q-switched laser comprising:
    a gain element having a first and a second surface, the first surface having a reflective coating at the eye-safe lasing wavelength to form a first end of a resonator;
    a saturable absorber element;
    a second end of the resonator having a partially transmitting optical coating at the eye-safe lasing wavelength;
    a pump source having a pump beam directed to the first surface of the gain element and which forms a pump spot on the first surface of the gain element;
    an aperture arranged to increase losses for higher order transverse modes and support single transverse mode operation; and
    wherein the passively Q-switched laser is configured to emit output pulses in the series of output pulses at varying time intervals between successive pulses using two or more axial modes, so as to create a distinct code relating to the series of output pulses, wherein the output pulses have a pulse energy in the range of 0.43 to 3.8 microjoules and an average repetition frequency in the range of 11 to 1820 kHz.

2. A passively Q-switched laser as recited in claim 1, wherein the saturable absorber element is spaced apart from the gain element.

3. A passively Q-switched laser as recited in claim 1, wherein the output pulses have a pulse duration in the range of 1.08 to 6.4 nanoseconds.

4. A passively Q-switched laser as recited in claim 1, wherein peaks in the axial mode spectrum are controlled such that the gain peak of the gain element is not centered on a peak of the axial mode spectrum and does not evenly straddle two peaks in the axial mode spectrum.

5. A passively Q-switched laser as recited in claim 1, wherein an average pulse frequency is adjusted by controlling a current to the pump source.

6. A passively Q-switched laser as recited in claim 1, further comprising a spacer positioned between the gain element and the saturable absorber element, the spacer including the aperture.

7. A passively Q-switched laser as recited in claim 1 wherein the two or more axial modes, are controlled relative to the gain peak of the gain element by passively controlling the resonator length.

8. A passively Q-switched laser as recited in claim 1 wherein the resonator length is actively controlled to shift the two or more axial modes, relative to a gain peak of the gain element.

9. A passively Q-switched laser as recited in claim 1 wherein a power of the pump beam is controlled to shift the two or more axial modes, relative to a gain peak of the gain element.

10. A passively Q-switched laser as recited in claim 1, wherein the output beam of the passively q-switched laser has an $M^2$ beam quality factor of less than or equal to 1.3.

11. A passively Q-switched laser as recited in claim 1, wherein intervals between sequential output pulses vary by up to 30%.

12. A passively Q-switched laser as recited in claim 1, wherein a small-signal, single-pass absorption of light by the saturable absorber element at the lasing wavelength is in the range of 2.5-21 percent.

13. A passively Q-switched laser as recited in claim 1, wherein the pump source is a laser diode and an output wavelength of the laser diode is locked by a grating.

14. A laser ranging system comprising:
    the passively Q-switched laser as recited in claim 1; and
    a detector.

15. A passively Q-switched laser as recited in claim 1, wherein the pump spot on the first surface of the gain element has a diameter less than 75 microns.

16. A passively Q-switched laser as recited in claim 1, wherein the pump spot on the first surface of the gain element has a diameter less than 50 microns.

17. A passively Q-switched laser configured to output a series of output pulses in an output beam at a lasing wavelength between 1.2 and 1.4 microns comprising:
- a gain element having a first and a second surface, the first surface having a highly reflective coating at the lasing wavelength between 1.2 and 1.4 microns to form a first end of a resonator;
- a saturable absorber element;
- a second end of the resonator having a partially transmitting optical coating at the lasing wavelength between 1.2 and 1.4 microns;
- a pump source having a pump beam directed to the first surface of the gain element;
- wherein the passively Q-switched laser is configured or controlled to emit output pulses in the series of output pulses at varying time intervals using two or more axial modes, so as to create a distinct code; and
- a deformable spacer, wherein the second end of the resonator is formed on a second surface of the saturable absorber element and the gain element is attached to a first side of the spacer and the saturable absorber element is attached to a second, opposing side of the spacer and the spacer is bendable such that the alignment of the first surface of the spacer with the second surface of the spacer may be adjusted so as to change the alignment of the first surface of the gain element with the second surface of the saturable absorber element.

18. A passively Q-switched laser configured to output a series of output pulses in an output beam at a lasing wavelength between 1.2 and 1.4 microns comprising:
- a gain element having a first and a second surface, the first surface having a highly reflective coating at the lasing wavelength between 1.2 and 1.4 microns to form a first end of a resonator;
- a saturable absorber element;
- a second end of the resonator having a partially transmitting optical coating at the lasing wavelength between 1.2 and 1.4 microns, wherein a distance between the first and second ends of the resonator is less than 5 mm;
- a pump source having a pump beam directed to the first surface of the gain element, wherein the pump beam has a pump spot diameter on the gain element that is less than 150 microns;
- an aperture arranged to increase losses for higher order transverse modes and encourage single transverse mode operation; and
- wherein the passively Q-switched laser is configured or controlled to emit output pulses in the series of output pulses at varying time intervals between successive pulses using two or more axial modes, so as to create a distinct code.

19. A passively Q-switched laser as recited in claim 18, wherein the output pulses have a pulse energy in the range of 0.43 to 3.8 microjoules and an average repetition frequency in the range of 11 to 1820 kHz.

20. A passively Q-switched laser as recited in claim 18, wherein the output pulses have a pulse energy in the range of 0.43 to 3.8 microjoules.

\* \* \* \* \*